United States Patent Office 3,634,422
Patented Jan. 11, 1972

3,634,422
PHOSPHORUS-CONTAINING REACTION PRODUCTS
Hermann Nachbur, Dornach, and Arthur Maeder, Therwil, Switzerland, assignors to Ciba Limited, Basel, Switzerland
No Drawing. Filed July 1, 1969, Ser. No. 838,321
Claims priority, application Switzerland, July 9, 1968, 10,210/68
Int. Cl. C07d 55/20, 55/24
U.S. Cl. 260—249.6   9 Claims

ABSTRACT OF THE DISCLOSURE

Phosphorus-containing reaction products from a condensation product from a 1,3,5-triazine containing at least 2 primary amino group and a phosphonopropionicacidamide, at least one of these two components being methylolated at the $H_2N$-groups, and formaldehyde or a reagent releasing formaldehyde. These products are useful for flame-proofing fibre materials containing cellulose.

---

The subject of the invention are phosphorus-containing reaction products from (a) a condensation product from (a') a 1,3,5-triazine which is substituted by at least 2 primary amino groups and (b') at least one compound of formula (1) 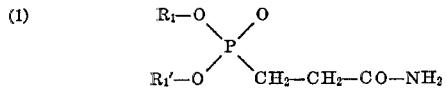

wherein $R_1$ and $R_1'$ each denote an alkyl, alkenyl or halogenalkyl residue having at most 4 carbon atoms and wherein the $H_2N$—groups of one of the components (a') or (b') are methylolated and optionally etherified, with (b) formaldehyde or a reagent releasing formaldehyde and (c) optionally, an alkanol having at most 4 carbon atoms.

Appropriately, the phosphorus-containing reaction product is built up of 1 mol of the component (a'), 4 to 6 mols of the component (b'), 3 to 4 mols of the component (b) and 0 to 4 mols of the component (c).

Possible 1,3,5-triazines are for example ammeline, acetoguanamine, formoguanamine, benzoguanamine or especially melamine.

The residues $R_1$ and $R_1'$ in Formula 1 may be mutually different or preferably identical. It is also possible for the reaction product to contain residues of more than one compound of Formula 1. This means that the phosphorus-containing reaction products can for example simultaneously contain the residues of formulae (2) 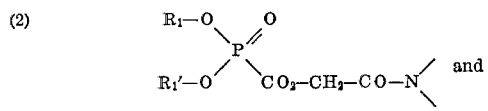 and (3) 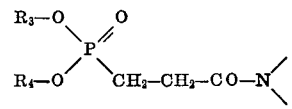

wherein $R_1$ and $R_1'$ and/or $R_3$ and $R_4$ are preferably mutually identical and $R_3$ and $R_4$ have the same significance as $R_1$ and $R_1'$.

Preferred phosphorus-containing reaction products correspond to the formula (4) 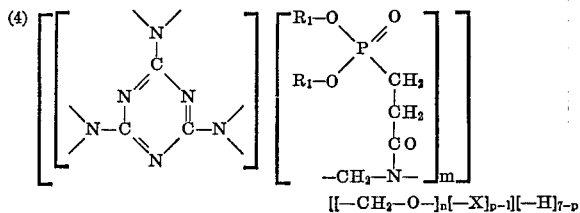

wherein $R_1$ denote alkyl, alkenyl or halogenalkyl groups having at most 4 carbon atoms, X denotes an alkyl group having at most 4 carbon atoms, and $m$, $n$ and $p$ each denote a positive integer, with $m$ having a value of 4 to 6, $n$ a value of 3 or 4 and $p$ a value of at most $n+1$.

Particularly suitable phosphorus-containing reaction products contain phosphonopropionic acid amide residues of formula (5) 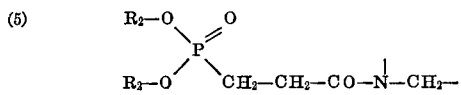

wherein $R_2$ represents an ethyl or methyl residue. The residue $R_1$ in Formula 4 can however for example also represent a n-propyl, isopropyl, allyl or chloralkyl residue, such as a 2-chlorethyl or 2,3-dichloropropyl residue.

In Formula 4 X can for example represent a n-butyl, n-propyl, isopropyl, ethyl or especially a methyl group. Phosphorus-containing reaction products which have either been completely etherified with methanol ($p=n+1$) or are completely unetherified ($p=1$) should however be highlighted.

The phosphonopropionic acid amide residues in Formula 4 and in Formula 5 are bonded to a nitrogen atom of the melamine radical by the methylene carbon atom. The —$CH_2$—O— residues are bonded by the carbon atom either to a nitrogen atom of the melamine radical or of a phosphonopropionic acid amide residue. The alkyl residues X are exclusively bonded to oxygen atoms of —$CH_2$—O— groups, whilst the hydrogen atoms are bonded to a nitrogen atom of the melamine radical or of the phosphonopropionic acid amide residue or to the oxygen atom of a —$CH_2$—O— group.

Depending on the value $m$ and $n$ have in Formula 4, one is dealing with reaction products having 4, 5 or 6 phosphonopropionic acid amide residues and 3 or 4 methylol groups, which can optionally be partially or completely etherified, this in turn depending on the value of $p$.

Preferred phosphorus-containing reaction products for example correspond to the formulae (6)

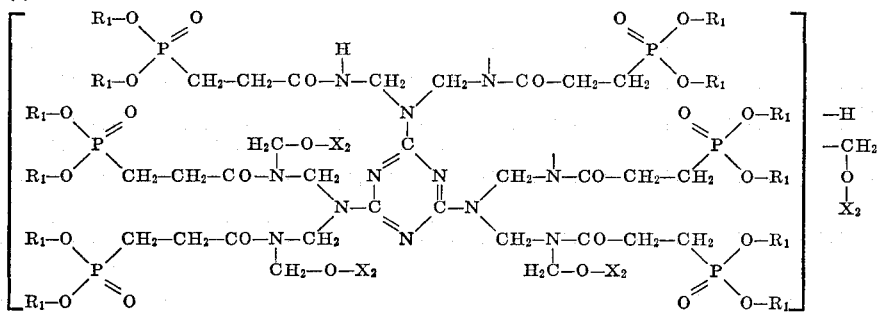

(7)

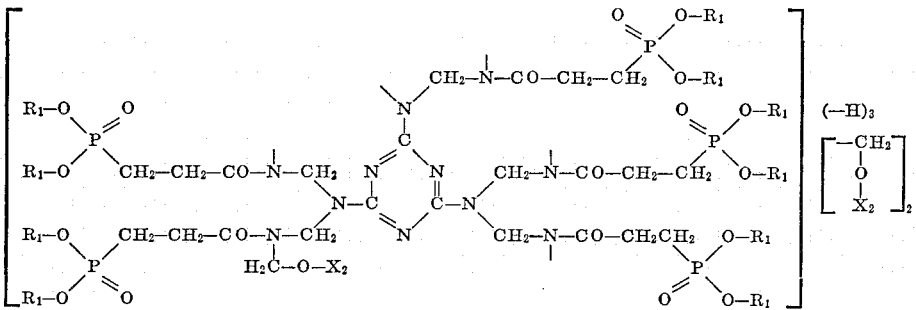

(8)

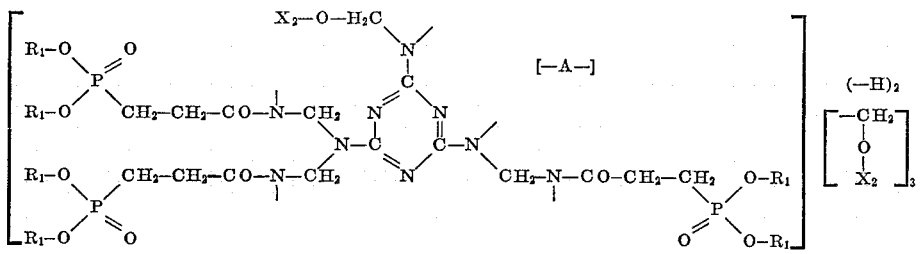

wherein $R_1$ has the significance indicated, $X_2$ denotes a hydrogen atom or a methyl group and A denotes a residue of formula

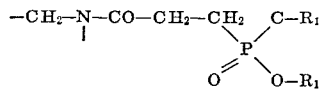

In Formulae 6, 7 and 8 $R_1$ preferably represents a methyl residue.

The phosphorus-containing reaction products according to the invention can be manufactured according to usual methods which are in themselves known. One possibility consists of (a) reacting a 1,3,5-triazine which is substituted by at least two optionally etherified dimethylolamino groups, such as for example hexamethylolmelamine, with a compound of Formula 1, methylolmelthe reaction product (a) with (b) formaldehyde or a reagent releasing formaldehyde, for example paraformaldehyde, and (c) subsequently optionally further etherifying it with an alkanol which contains at most 4 carbon atoms.

A compound of Formula 4 is obtained if a compound of formula (9)

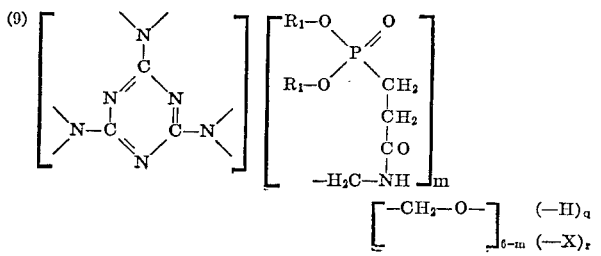

wherein $R_1$ and $m$ have the significance indicated, $q$ and $r$ each denote 0, 1 or 2 and the sum $q+r=6-m$, is reacted with formaldehyde or a reagent releasing formaldehyde at elevated temperature, optionally in the presence of a basic catalyst, and if optionally the methylol groups which are still free are subsequently etherified and an alkanol containing at most 4 carbon atoms.

The reaction of a compound of Formula 9 or of the reaction product a) with formaldehyde or a reagent releasing formaldehyde, such as paraformaldehyde, advantageously takes place at temperatures up to 150° C., preferably at 50 to 100° C. Optionally, this reaction is performed in the presence of a basic catalyst, with both strong bases such as sodium hydroxide or potassium hydroxide and also weak bases such as sodium acetate, magnesium carbonate or magnesium oxide being possible.

The degree of methylolation can be determined by determining the bonded formaldehyde.

Compounds of Formula 4 wherein $p$ is greater than 1, or etherified phosphorus-containing reaction products, are obtained by complete or partial etherification of the methylol groups with a monohydric aliphatic alcohol which contains at most 4 carbon atoms, in the presence of an acid.

The starting products of Formula 9, or the condensation products (a), are appropriately obtained by condensation of a compound of Formula 1 with a 1,3,5-triazine containing at least 2 primary amino groups, with the $H_2N-$ groups of one of these two starting components having to be methylolated, with warming, appropriately in the presence of an organic solvent which forms an azeotrope with water, such as for example benzene or toluene.

The invention also relates to a process for the flameproofing of cellulose-containing fibre materials and is characterised in that an aqueous prepartion which contains at least one phosphorus-containing reaction product of the indicated composition is applied to these materials, and that the materials are thereafter dried and subjected to a treatment at elevated temperature.

In particular, the phosphorus-containing reaction products or the compounds of Formula 4 are suitable for flameproofing fibre maerials of regenerated cellulose, so-called rayon. Preferably, one is here dealing with textile materials in each case. Compounds of Formulae 6 to 8 are preferred for flameproofing.

The pH-value of the aqueous preparations containing the phosphorus-containing reaction products is advantageously less than 5. In order to achieve this, strong mineral acids such as sulphuric acid, nitric acid or preferably hydrochloric acid are added to the preparations. Instead of the acids themselves, especially instead of hydrochloric acid, it is also possible to use compounds from which the corresponding acids are easily, for example even without warming, formed in water by hydrolysis. An examples, phosphorus trichloride, phosphorus pentachloride, phosphorus oxychloride, thionyl chloride, sulphuryl chloride, cyanuryl chloride, acetyl chloride and chloracetyl chloride may here be mentioned. These compounds exclusively yield acid decomposition products, for example cyanuric hydrochloric acid, on hydrolysis. Now it can be advantageous to employ, instead of one of the strong acids indicated, the acid mixtures corresponding to the hydrolysis products of one of the compounds just mentioned.

However, the preparations preferably contain so-called latent acid catalysts, such as for example ammonium chloride, ammonium dihydrogen orthophosphate, magnesium chloride, zinc nitrate and others, for accelerating the cure.

Apart from the phosphorus-containing reaction products and the additives necessary for adjusting the pH-value, the preparations for flameproofing can contain yet further substances.

An addition of aminoplastic pre-condensates such as for example of a methylol compound of melamine, of glyoxalmonourein or of urea, is possible, but is not absolutely necessary for achieving a wash-fast flameproofing finish, especially on regenerated cellulose.

It can also be advantageous if the preparations contain a copolymer, obtainable by polymerisation in aqueous emulsion, from (a) 0.25 to 10% of an alkaline earth salt of $\alpha,\beta$-ethylenically unsaturated monocarboxylic acid, (b) 0.25 to 30% of a N-methylolamide or N-methylolamide-ether of an $\alpha,\beta$-ethylenically unsaturated monocarboxylic or dicarboxylic acid, and (c) 99.5 to 60% of at least one other copolymerisable compound. These copolymers and their manufacture are also known. The tear strength and abrasion resistance of the treated fibre material can be advantageously influenced by the conjoint use of such a copolymer.

As a further additive which is advantageous in some cases, a plasticising finishing agent, for example an aqueous polyethylene emulsion or ethylene copolymer emulsion, should be mentioned.

The content of phosphorus-containing reaction products or compounds of Formula 3 of the aqueous preparations is appropriately of such magnitude that 10 to 28% are applied to the material to be treated. Here it is necessary to take into account that the commercially available textile materials from native or regenerated cellulose can take up between 50 and 120% of an aqueous preparation.

The amount of the additive required to adjust the hydrogen ion concentration to the value of less than 5 depends on the selected value and on the nature of the additive, but it must in any case not fall below a certain minimum. A certain excess above this minimum quantity is generally to be recommended. Large excesses offer no advantage and can even prove harmful.

If a polymer of the indicated nature is further added to the preparation, then this is advantageously done in small quantities, for example 1 to 10% relative to the quantity of the phosphorus-containing reaction product or compound of Formula 4. The same is true of an optional plasticiser, where the appropriate quantities can again amount to 1 to 10%.

The preparations are now applied to the cellulose-containing fibre materials, for example linen, cotton, acetate rayon, viscose rayon or also fibre mixtures of such materials and others such as wool, polyamide or polyester fibres, and this can be effected in a maner which is in itself known. Preferably, piece goods are used and these are impregnated on a padder of the usual construction, which is fed with the preparation at room temperature.

The fibre material which has been impregnated in this way now has to be dried, and this appropriately takes place at temperatures up to 100° C. Thereafter it is subjected to a dry heat treatment at temperatures above 100° C., for example between 130 and 200° C., and preferably between 150 and 180° C., the duration of which can be the shorter, the higher the temperature. This duration of heating is for example 2 to 6 minutes at temperatures of 150 to 180° C. Since, in the course of this process, the methylol or methylol-ether residues in the phosphorus-containing reaction products or in the compounds of Formula 4 are split, water or an alcohol is thereby produced. Now it has been found that these volatile decomposition products must be continuously removed from the material in order that the desired effect can manifest itself to the full extent. The devices in which the heat treatment is carried out are to be chosen accordingly. Apparatuses in which, whilst maintaining the prescribed temperature, fresh air is continuously introduced and the air charged with the resulting volatile substances is continuously removed, are very suitable. Such devices, for example so-called turbofixers or nozzle-fixers, are known.

A post-wash with an acid-binding reagent, preferably with aqueous sodium carbonate solution, for example at 40° C. up to the boiling point and lasting 3 to 10 minutes is appropriate in the case of a strongly acid reaction medium.

As already indicated, flameproof finishes can be obtained according to the present process which remain largely preserved even after repeated washing or dry cleaing and which do not cause any unacceptable reduction in the mechanical textile properties of the treated mateial. The dry creasing angle of the material which is thus resistant to washing at the boil and provided with a flameproof finish is even further improved.

The percentages and parts in the examples which follow are units by weight unless otherwise specified. The relationship of parts by volume to parts by weight is as of ml. to g.

EXAMPLE 1

724 parts of 3-dimethyl-phosphonopropionamide and 222.4 parts of hexamethylolmelamine are suspended in 1000 parts of benzene in a stirred flask of capacity 2500 parts by volume, provided with a water separator. 9.6 parts of p-toluenesulphonic acid are further added and the mixture is heated to the boiling point of the benzene, with the water formed during the condensation being removed azeotropically and collected in the water separator. After 20 hours' reaction time no further water is formed. 75 parts of water (calculated: 73 parts) are obtained. The benzene is thereafter removed in vacuo and simultaneously 400 parts of water are gradually run in dropwise.

400 parts of 40% strength aqueous formaldehyde are added to the residual cloudy solution and methylolation carried out for 4 hours at 60° C. A pH-value of 8 to 8.5 is maintained by dropwise addition of a total of 14.5 parts of 30% strength sodium hydroxide solution and is continuously controlled by means of a pH-electrode. After cooling to room temperature, 1530 parts of an opalescent solution are obtained, which remain cloudy even after a filtration. The content of active substance is 60%. On the basis of the determined content of bonded formaldehyde a tetramethylol compound of the following Formula is present.

(10)

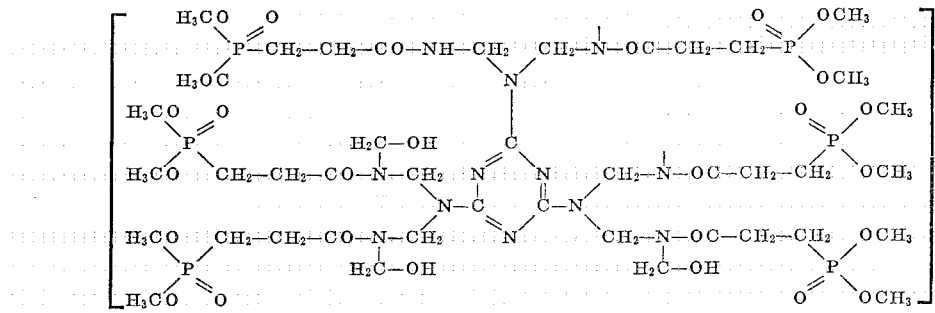

EXAMPLE 2

An analogous procedure to Example 1 is followed, with the sole difference that 306 parts (1 mol) of hexamethylolmalamine (instead of 222.4 parts) are employed. 74 parts of water of condensation are separated off (calculated: 73 parts). 1640 parts of an opalescent solution which remains opalescent even after a filtration, are obtained. The content of active substance is 62%. The following formaldehyde values are found: Total $CH_2O$: 188 parts (of which 68 parts of $CH_2O$ originate from the hexamethylolmelamine and 120 parts are employed for the methylolation). Free $CH_2O$: 58 parts. Bonded $CH_2O$: 130 parts.

It may thus be assumed that 62 parts of $CH_2O$ are bonded to the secondary —CONH— groups by the methylolation, and this correspond to a tetramethylol compound of the following formula:

(11)

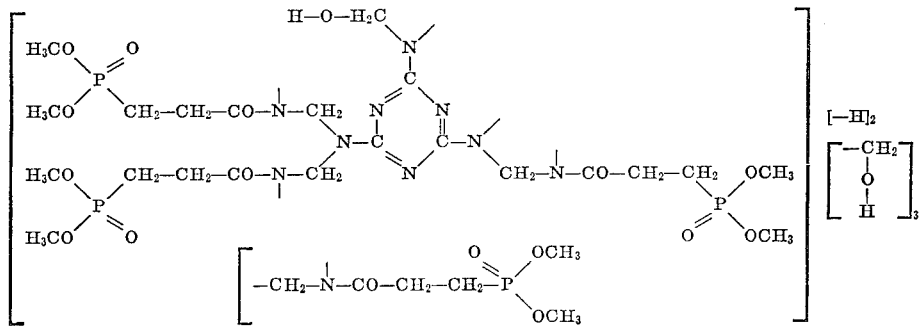

EXAMPLE 3

100 parts of the 60% strength solution described in Example 1 are mixed with 50 parts of methanol in a stirred flask of capacity 250 parts by volume, provided with a reflux condenser, thermometer and pH-electrode, and warmed to 40° C. Thereafter etherification is effected for 25 minutes at 40 to 45° C. and a pH-value of 4.0 to 4.5, with the pH-value being maintained by adding a total of 0.6 part of 30% strength hydrochloric acid. After the end of this reaction time the pH-value is adjusted to 8 by adding 30% strength sodium hydroxide solution and the etherification reaction thereby stopped. Thereafter the excess methanol is removed in vacuo.

The resulting syrupy residue contains 60% of active substance and corresponds to the formula (12)

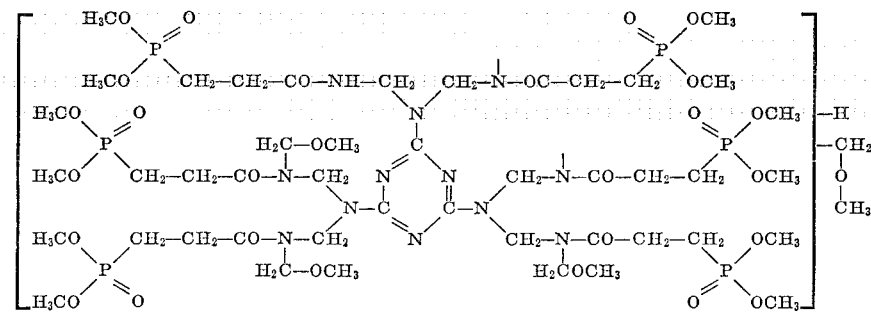

EXAMPLE 4

230 parts of 3 - diethylphosphonopropionamide (1.1 mols) and 61.2 parts of hexamethylolmelamine (0.2 mol) are suspended in 250 parts of toluene in a stirred flask of capacity 500 parts by volume provided with a water separator. A further 3 parts of p-toluenesulphonic acid are added and the mixture is heated to the boiling point of the toluene. The water formed during the condensation is removed azeotropically and collected in the water separator. After 2½ hours no further water is separated off. 22 parts of water are obtained (calculated: 20 parts). The toluene is removed in vacuo.

260 parts of this reaction product are mixed with 78.2 parts of aqueous formaldehyde (40.8% strength) and methylolated for 4 hours at 60° C. A pH-value of 8 to 8.5 is maintained by dropwise addition of a total of 4 parts of 30% strength sodium hydroxide solution and is continuously controlled by means of a pH-electrode. After cooling to room temperature and filtering, 377 parts of a cloudy solution of low viscosity are obtained. The content of active substance is 83%. On the basis of the determined content of bonded formaldehyde, a tetramethylol compound of the following formula is present:

EXAMPLE 6

181 parts of 3 - dimethylphosphonopropionamide (1 mol) and 85 parts of dimethylolacetoguanamine (0.5 mol) are suspended in 250 parts of benzene in a stirred flask of capacity 500 parts by volume provided with a water separator. 2.4 parts of p-toluenesulphonic acid are further added and the mixture is heated to the boiling point of the benzene, with the water formed during the condensation being azeotropically removed and collected in the water separator. After 18 hours no further water is separated off. 18 parts of water are obtained, corresponding to the theoretically calculated quantity. The benzene is removed in vacuo and thereafter diluted with 100 parts of water. 82.5 parts of a 36.4% strength aqueous formaldehyde solution (1 mol of $CH_2O$) are then

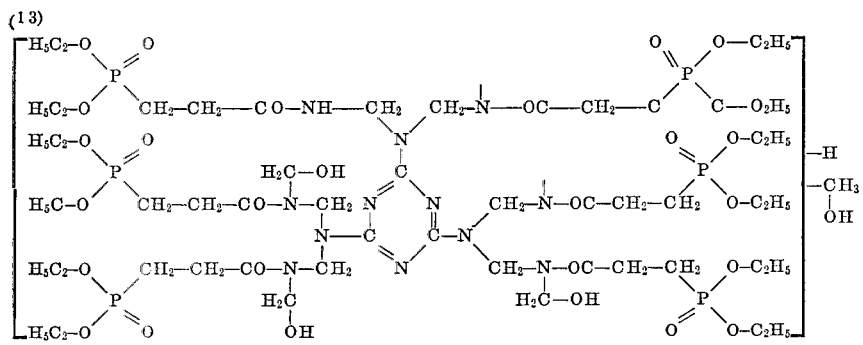
(13)

EXAMPLE 5

The experiment described in Example 1 is repeated with the exception that only half the quantity of formaldehyde (that is to say 200 parts of 40% strength aqueous $CH_2O$) are employed. After 4 hours' methylolation at 60° C. and at a pH-value of 8 to 8.5 the mixture is cooled to room temperature and then diluted with 80 parts of methanol, insoluble constituents are filtered off, and the filtered product is freed of methanol and water in vacuo at 50° C.

247 parts of a cloudy viscous syrup containing 100% of active substance are obtained. On the basis of the determined content of bonded formaldehyde, a trimethylol compound of formula added and the mixture kept for 4 hours at 60° C. and at a pH-value of 8 to 8.5. The pH-value is maintained by means of dropwise addition of a total of 9.6 parts of 30% strength aqueous sodium hydroxide solution and is continuously controlled by means of an electrode. After cooling to room temperature and filtering, 380 parts of an opalescent syrupy solution containing 64% of active substance are obtained. On the basis of the determined content of bonded formaldehyde, a dimethylol compound of the following formula:

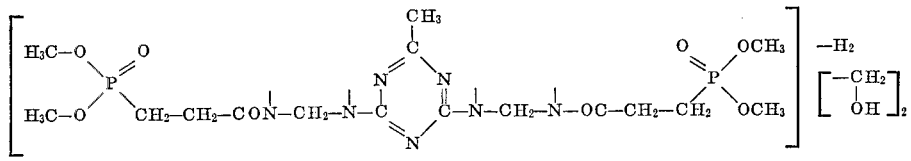
(15)

is present.

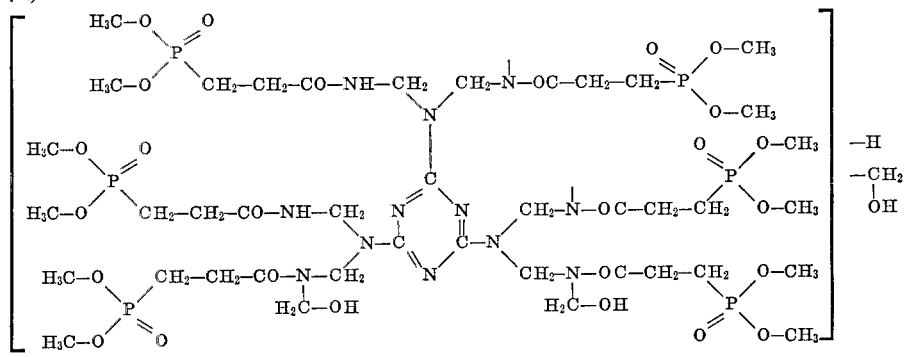
(14)

is present.

EXAMPLE 7

305.8 parts of bis-(2 - chlorethyl)phosphonopropionamide (1.1 mols) and 61.2 parts of hexamethylolmelamine (0.2 mol) are suspended in 300 parts of toluene in a stirred flask of capacity 500 parts by volume, provided with a water separator. After addition of 3 parts of p-toluenesulphonic acid the mixture is heated to the boiling point of toluene. The water formed during the condensation is collected in the water separator. After 70 minutes the reaction is already complete and the theoretically calculated quantity of water (20 parts) is obtained. The toluene is largely decanted and thereafter 34 parts of 97% strength paraformaldehyde (1.1 mols) are added. The mixture is now heated to 95–100° C. internal temperature, 7 parts of a 27% strength sodium methylate solution in methanol are added, and the reaction is kept at 95 to 100° C. for 2 hours.

Thereafter the mixture is cooled to room temperature, diluted with 300 parts of methanol, and the unreacted paraformaldehyde is filtered off. 17 parts of paraformaldehyde are recovered. The filtrate is freed of methanol and residual quantities of toluene in vacuo at 50° C. to the point that an 80% strength product is produced. 335 parts of a cloudy viscous water-insoluble product are obtained.

On the basis of the reacted paraformaldehyde, a mixture of a dimethylol compound and trimethylol compound of the following formula is present:

EXAMPLE 9

500 parts of the 80% strength reaction product according to Example 7 are dissolved in 200 parts of trichlorethylene and 40 parts of a 50% strength aqueous solution of a condensation product of 1 mol of hydroabietyl alcohol and 200 mols of ethylene oxide, crosslinked with 1% of hexamethylene - 1,6-diisocyanate, are admixed. Thereafter 240 parts of water are slowly admixed in a homogenising apparatus and 20 parts of 85% strength phosphoric acid are further added to the resulting emulsion. A woven cellulose fabric (mercerised, bleached, 150 g./m.$^2$) is padded in this emulsion, dried at 80° C. and cured for 4½ minutes at 160° C. Thereafter the fabric is post-washed at the boil for 5 minutes in a solution of 2 parts of sodium carbonate in 1000 parts of water, and then rinsed and dried. The woven fabric possesses a deposit of substance of 23.3% of its original weight. The flameproof behaviour according to test method DIN 53906 (6 seconds ignition time) is very good.

EXAMPLE 10

A woven cotton fabric (CO) and a woven viscose rayon fabric (CV) are padded with one of the aqueous liquors A to C of the table which follows. The liquor uptake is 80%. Drying is carried out at 70 to 80° C. followed by curing for 4½ minutes at 160° C.

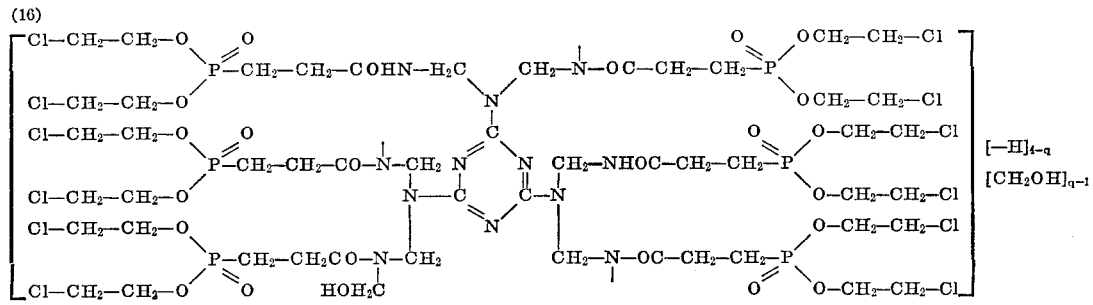

$q=2$ or $3$

EXAMPLE 8

One woven fabric at a time of regenerated cellulose (bleached viscose rayon calico, 125 g./m.$^2$) is padded in one solution at a time of 500 parts of a 60% strength product of Examples 1 to 3, 480 parts of water and 20 parts of a 25% strength ammonium chloride solution. The woven fabrics are dried at 80° C. and subsequently heat-fixed for 4½ minutes at 160° C., and are then post-washed for 5 minutes at 60° C. in a solution of 2 parts of sodium carbonate in 1000 parts by volume of water.

The woven fabrics show an excellent flameproofing effect which remains preserved unchanged even after 5-fold SNV-3 washing.

The woven fabric is now post-washed for 5 minutes at the boil (CO) and at 60° C. (SV) respectively in a solution containing 2 g. of anhydrous sodium carbonate per litre of water, rinsed and dried. A part of the woven fabric is boiled (CO) or washed at 60° C. (CV), respectively, 5 times or 10 times for 30 minutes in a solution containing 2 g. of sodium carbonate and 5 g. of soap per litre of water (=CNV–4 or SNV–3 wash, respectively).

The individual pieces of woven fabric are then tested for their flameproof behaviour (vertical test according to DIN 53906). The results of these tests are also summarised in the table which follows:

| Constituents | Untreated | Treated with preparation | | |
|---|---|---|---|---|
| | | A | B | C |
| Product according to example 4 g./l | | 485 | | |
| Product according to example 5 g./l | | | 355 | |
| Product according to example 6 g./l | | | | 655 |
| NH$_4$Cl, g./l | | 4 | 4 | 4 |
| pH of the preparation | | 4.1 | 4.8 | 5.1 |
| | | CO  CV | CO  CV | CO  CV |
| Flameproof property: | | | | |
| After post-washing: | | | | |
| Burning time (sec.) | Burns | 0    0 | 0    0 | 0    0 |
| Tear length (cm.) | 10.5 | 9    8.5 | 8.5  11 | 8    8 |
| Plus after 5 SNV–4 or SNV–3 washes: | | | | |
| Burning time (sec.) | Burns | 0    0 | 0    0 | 0    0 |
| Tear length (cm.) | 10 | 9    8 | 8    9.5 | 8    8 |
| Plus after 10 SNV–4 or SNV–3 washes: | Burns | 0    0 | 0    0 | 0    0 |
| Burning time | Burns | | | |
| Tear length (cm.) | 10 | 10   8 | 8    8 | 9    9 |

We claim:
1. Phosphorus-containing reaction product corresponding to the formula

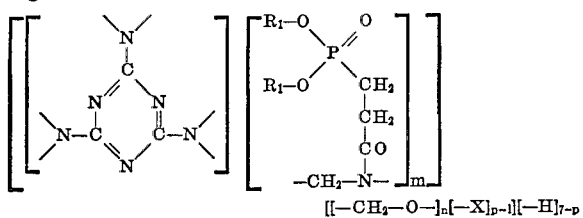

wherein $R_1$ denotes a member selected from the group consisting of an alkyl, alkenyl and halogenalkyl radical having at most 4 carbon atoms, X denotes an alkyl group having at most 4 carbon atoms and $m$, $n$ and $p$ each denote a positive interger, with $m$ having a value of 4 to 6, $n$ a value of 3 to 4 and $p$ a value of at most $n+1$.

2. Phosphorus-containing reaction product according to claim 1 characterised in that its phosphonopropionic acid amide radicals correspond to the formula

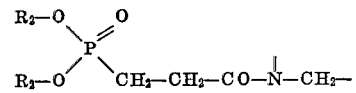

wherein $R_2$ represents an ethyl or methyl radical.

3. Phosphorus-containing reaction product according to claim 1 characterised in that the radical X represents a methyl group.

4. Phosphorus-containing reaction product according to claim 1 corresponding to the formula

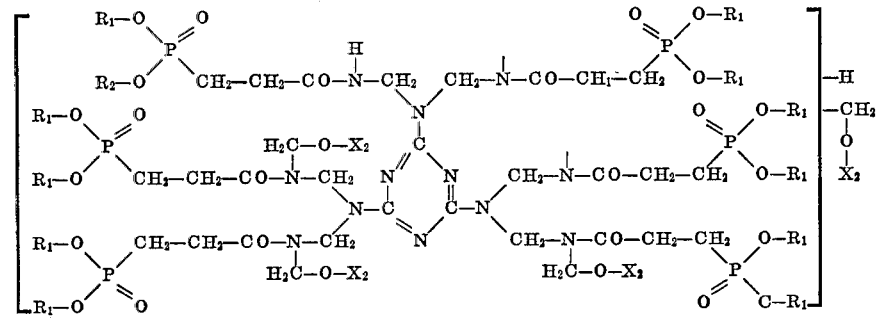

wherein $R_1$ denotes a member selected from the group consisting of an alkyl, alkenyl and halogenalkyl radical having at most 4 carbon atoms and $X_2$ denotes a hydrogen atom or a methyl group.

5. Phosphorus-containing reaction product according to claim 1 corresponding to the formula

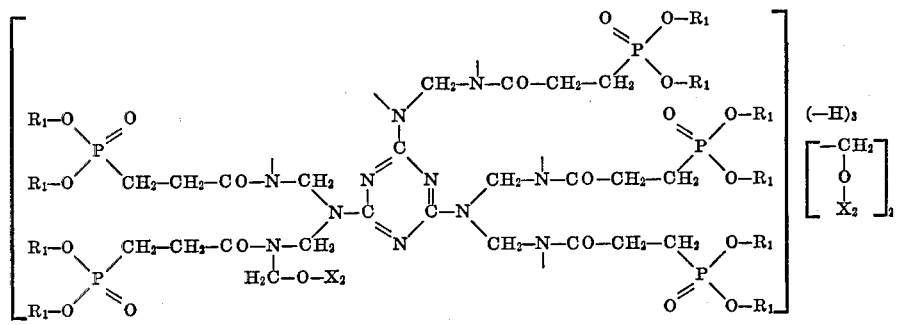

wherein $R_1$ denotes a member selected from the group consisting of an alkyl, alkenyl and halogenalkyl radical having at most 4 carbon atoms and $X_2$ denotes a hydrogen atom or a methyl group.

6. Phosphorus-containing reaction product according to claim 1 corresponding to the formula

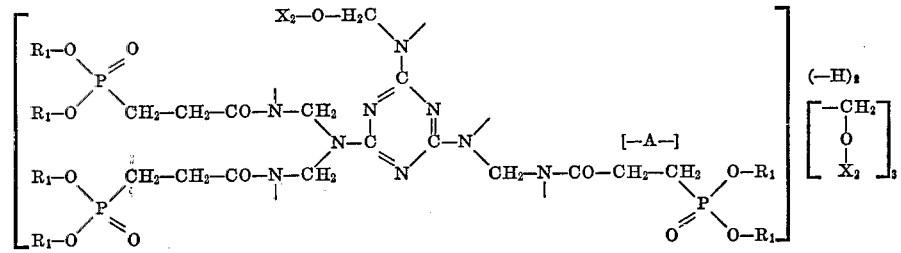

wherein $R_1$ denotes a member selected from the group consisting of an alkyl, alkenyl and halogenalkyl radical having at most 4 carbon atoms, $X_2$ denotes a hydrogen atom or a methyl group, and A is a radical of the formula

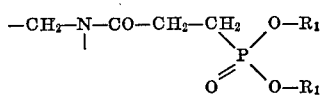

wherein $R_1$ has the indicated significance.

7. The phosphorus-containing reaction product according to claim 1 corresponding to the formula (10)

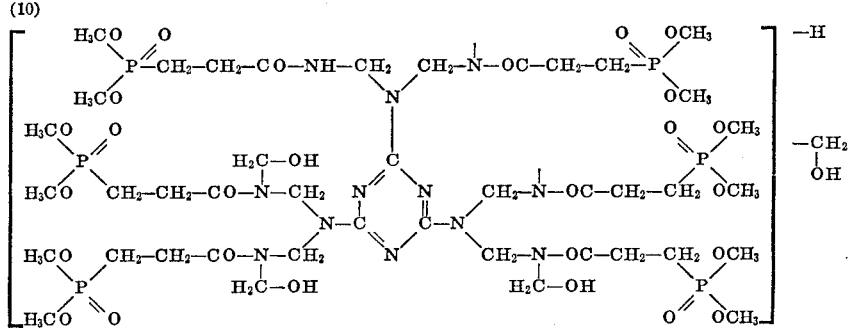

8. The phosphorus-containing reaction product according to claim 1 corresponding to the formula (11)

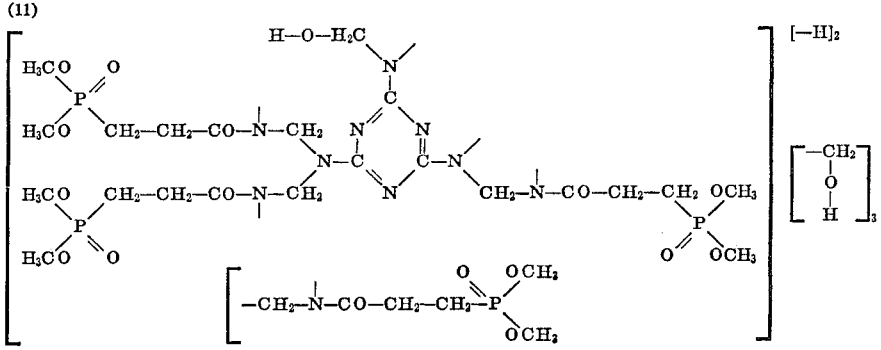

9. The phosphorus-containing reaction product according to claim 1 corresponding to the formula (12)

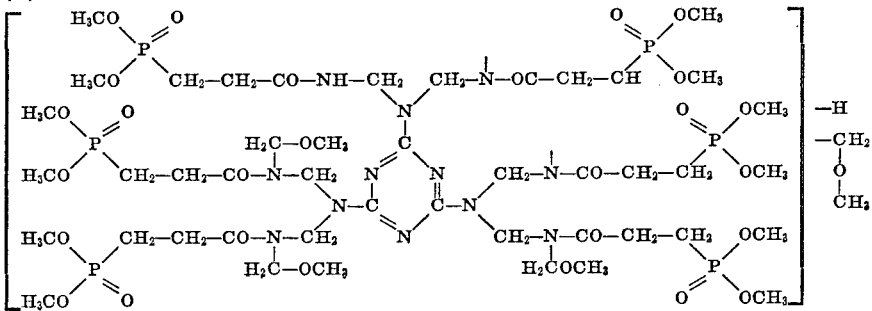

References Cited

UNITED STATES PATENTS 3,322,762  5/1967  Erikson et al. _____ 260—249.6
3,415,768  12/1968  Dieterich et al. ____ 260—249.6

JOHN M. FORD, Primary Examiner

U.S. Cl. X.R.

260—249.9, 249.8, 45.8 N; 117—136; 252—8.1

CASE 6510/E

UNITED STATES PATENT OFFICE
CERTIFICATE OF CORRECTION

Patent No. 3,634,422                                  Dated January 11, 1972

Inventor(s) Hermann Nachbur et al

It is certified that error appears in the above-identified patent and that said Letters Patent are hereby corrected as shown below:

Column 13, claim 4, the top of the structural formula should read ---

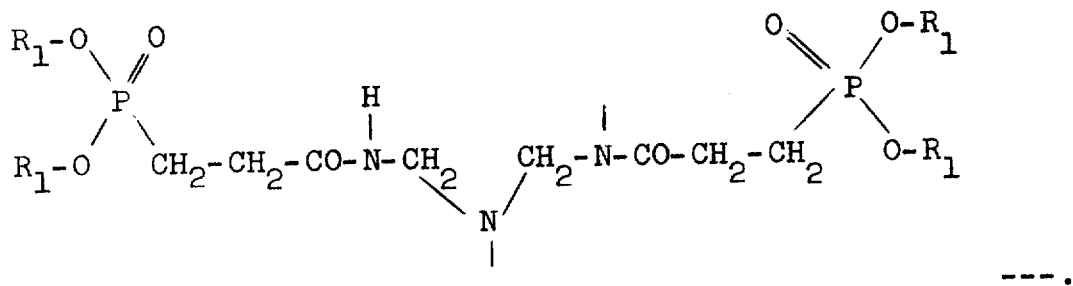

---.

Column 15, claim 9, the top right-hand side of the structural formula should read ---

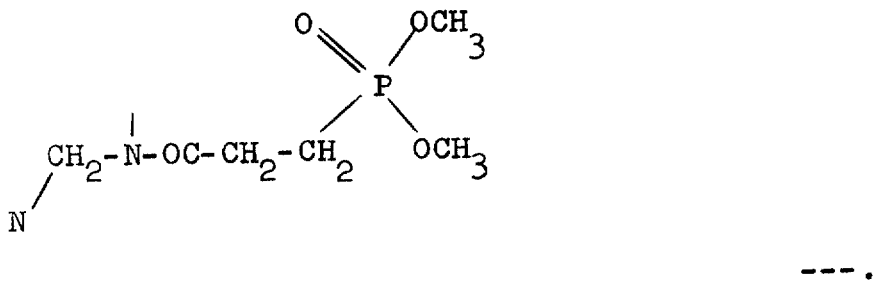

---.

Signed and sealed this 15th day of August 1972.

(SEAL)
Attest:

EDWARD M. FLETCHER, JR.          ROBERT GOTTSCHALK
Attesting Officer                 Commissioner of Patents